United States Patent [19]
Zerrer et al.

[11] Patent Number: 4,461,055
[45] Date of Patent: Jul. 24, 1984

[54] PORTABLE SWEEPING DEVICE

[75] Inventors: Gerhard Zerrer, Korb; Hans Trumpf, Leutenbach, both of Fed. Rep. of Germany

[73] Assignee: Andreas Stihl, Waiblingen, Fed. Rep. of Germany

[21] Appl. No.: 393,681

[22] Filed: Jun. 30, 1982

[30] Foreign Application Priority Data

Jul. 1, 1981 [DE] Fed. Rep. of Germany ....... 3125889

[51] Int. Cl.³ .............................................. A47L 5/24
[52] U.S. Cl. .................................. 15/344; 15/327 C; 15/405; 417/234; 417/364
[58] Field of Search .................... 15/344, 405, 327 C; 417/234, 364

[56] References Cited

U.S. PATENT DOCUMENTS

| | | | |
|---|---|---|---|
| 4,132,507 | 1/1979 | Akiyama et al. | 15/405 |
| 4,187,577 | 2/1980 | Hansen et al. | 15/405 X |
| 4,223,419 | 9/1980 | Sato et al. | 15/405 X |
| 4,237,576 | 12/1980 | Stakes | 15/405 X |
| 4,288,886 | 9/1981 | Siegler | 15/405 X |
| 4,318,203 | 3/1982 | Satoh et al. | 15/405 X |

Primary Examiner—Chris K. Moore
Attorney, Agent, or Firm—Walter Ottesen

[57] ABSTRACT

A portable sweeping device which operates with an air-blast flow, and comprises a housing having a handle arranged at the upper end, and a fanwheel blower or impeller arranged in the housing and driven by an internal combustion engine arranged in the direction of the axis of rotation of the blower; the blower generates an air flow which exits through an air discharge outlet of the housing. The axis of rotation of the fanwheel blower is arranged at least substantially vertically during use.

12 Claims, 7 Drawing Figures

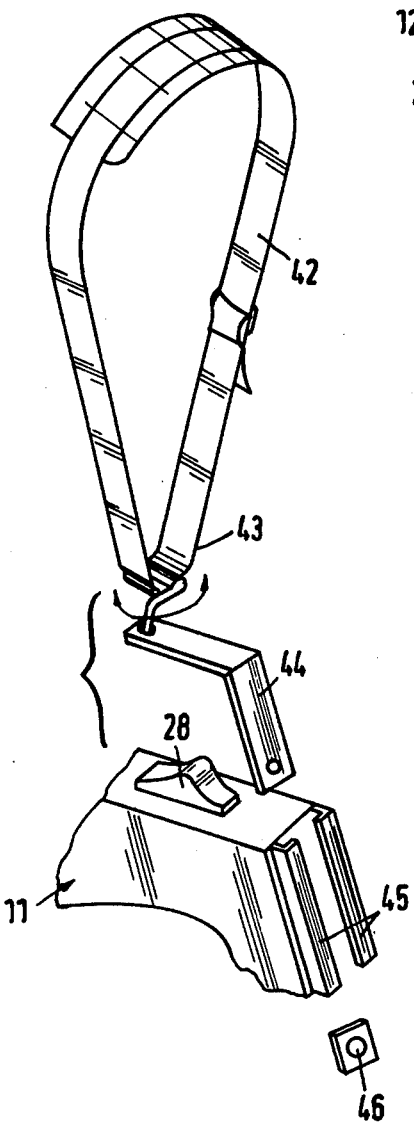
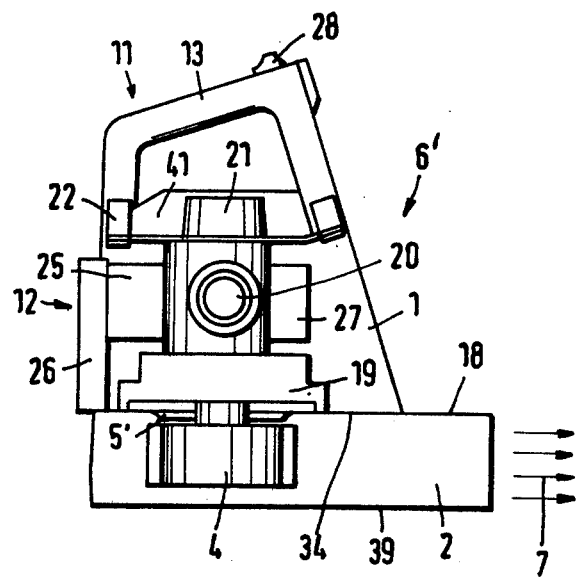
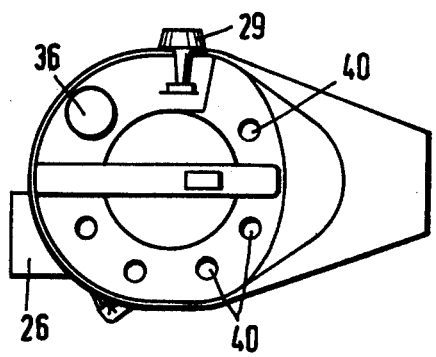

PORTABLE SWEEPING DEVICE

FIELD OF THE INVENTION

The present invention relates to a portable sweeping device which operates with an air-blast flow, and comprises a housing having a handle arranged at the upper end, and a fanwheel blower or impeller arranged in the housing and driven by an internal combustion engine arranged in the direction of the axis of rotation of the blower; the blower generates an air flow which exits from the housing through an air discharge outlet.

BACKGROUND OF THE INVENTION

Such sweeping devices are guided manually and serve to remove leaves and light refuse from paths, sidewalks, walkways, benches, and similar surfaces by means of the air blast flow. The devices are employed, for example, on playing fields, in stadiums, arenas, etc.

With known sweeping devices of this type, the impeller or fanwheel blower is arranged in a vertical plane and rotates about a horizontal axis, whereby the drive motor and corresponding auxiliary devices are located next to the fanwheel blower. During operation, gyroscopic or centrifugal forces effective counter to the movement arise during pivoting of this sweeping device about a vertical axis. Such forces must be absorbed by the carrying or supporting hand of the operator. In order to reduce the forces required to guide the air blast flow, it has already been proposed to install an elastic intermediate piece between the actual outlet or discharge tube of the sweeping device, and a discharging tube or air-blast tube which forms the air discharge outlet; the air-blast tube can be guided by the second hand of the operator without having to apply great force, and independent of the position of the sweeping device. This construction, however, is very costly and cumbersome, and the flexible discharge channel acts in a flow-impeding manner, so that loss of capacity must be put up with. Additionally, the guiding of the sweeping device requires both hands of the operator, which in many situations is very troublesome.

SUMMARY OF THE INVENTION

It is an object of the present invention to construct a sweeping device in such a way that it can be guided with one hand, that maximum power output is assured with a simple construction, and also that no gyroscopic or centrifugal forces arise to impede intense and random guiding movements of the device about a vertical axis.

The sweeping device of the present invention is characterized primarily in that the axis of rotation of the impeller or fanwheel blower is arranged at least substantially vertically during use.

Due to the position of the fanwheel blower, no gyroscopic forces are effective in a horizontal pivot plane, so that the sweeping device can be easily guided, and so that the arm or the hand of the operator is not stressed with gyroscopic forces during pivoting about a vertical axis. The construction of the sweeping device can be simplified with the vertical arrangement of the axis of rotation of the fanwheel blower or impeller.

According to an advantageous construction, the impeller or fanwheel blower is arranged in the lower region of the housing, so that the air discharge outlet can be arranged in the plane of the fanwheel blower directly above the bottom, as a result of which flow-impeding and costly air guides are avoided, and additionally the recoil forces of the air flow can be utilized for transfer and stabilization of the sweeping device in an advantageous operating position. Additionally, a favorable throttle factor can be achieved as a result of the construction according to the present invention, so that an advantageous energy conversion is possible. The throttle factor determines the resistance parabola of the channel or conduit, and accordingly determines the operating level or point of the blower on the throttle curve.

A drum rotor is advantageously used as a fanwheel blower or impeller so that a smaller fanwheel blower diameter can be selected at the same capacity or power. Consequently, the sweeping device can be smaller and more compact.

According to specific features of the present invention, the crankshaft of the internal combustion engine may be coaxial with the axis of rotation of the fanwheel blower.

The fanwheel blower or impeller may be located in the lower region of the housing, and the internal combustion engine, with its auxiliary devices, may be arranged thereabove; advantageously, the housing may comprise an upper housing part, which accommodates the engine with its auxiliary devices, and a lower housing part, which is arranged axially therebelow and accommodates the fanwheel blower; the upper housing part may have a cylinder-like base body with a cross section which is circular to oval in shape, while an air channel terminating with an air discharge outlet may be formed on the lower housing part, and preferably has a rectangular cross section.

The housing parts may be separated from each other in an extensively airtight manner, and the air intake opening may be arranged in the bottom surface of the housing; the air intake opening may be located axially relative to the fanwheel blower or impeller, which is preferably constructed as a drum rotor, and may correspond approximately to the cross section of the fanwheel blower.

The air intake opening may be provided in the separating well between the two housing parts, and the upper housing part may have air inlet openings, preferably in the region of the domed top of the housing, with the air intake opening being located axially relative to the fanwheel blower or impeller, which is preferably constructed as a drum rotor, and corresponds approximately to the cross section of the fanwheel blower; preferably, the engine exhaust gases are fed to the blower air flow, especially on the intake side of the fanwheel blower.

In the operating position of the blower device, the air flow may be inclined by approximately 20° to 40° to the ground, walkway, sidewalk, etc., and the grip of the handle may rise, when viewed in the direction toward the air discharge outlet, at a corresponding angle to the bottom surface of the housing in such a manner that the grip is predominantly horizontal in the operating position of the sweeping device.

The bottom surface of the housing may be inclined in the front end region of the air channel toward the air discharge outlet, and a stand or support may be fastened at that end of the lower housing part opposite the air discharge outlet; the stand or support preferably comprises a U-shaped bracket arranged transverse to the handle, and is fixed in the housing with the legs of the bracket, whereby the rest position of the sweeping device, determined by the stand and the incline, corresponds approximately to the operating position thereof.

A starter device may be arranged in the region of the domed top of the housing in the immediate vicinity of the handle, and the exhaust gases may be discharged on that side of the sweeping device remote from the operator, whereby the air intake filter is open to the atmosphere on that side of the sweeping device opposite the air discharge outlet.

The handle is advantageously fastened via anti-vibration elements to a support plate which supports the internal combustion engine.

A mounting support may be provided on the handle for placing a shoulder strap; the mounting support may comprise a rigid bracket which is attached in the axis of gravity of the handle, can preferably be secured to the front handle part or leg, and has a freely rotatable suspension mechanism on its free end.

BRIEF DESCRIPTION OF THE DRAWING

The invention will now be described with reference to the drawing wherein:

FIG. 5 is a partially-sectioned side view of a modified construction of the sweeping device according to the present invention;

FIG. 6 is a plan view of the sweeping device of FIG. 5; and,

FIG. 7 is a fragmentary, exploded perspective view of the shoulder strap of the sweeping device of FIG. 4.

DESCRIPTION OF THE PREFERRED EMBODIMENTS OF THE INVENTION

Figure 1:
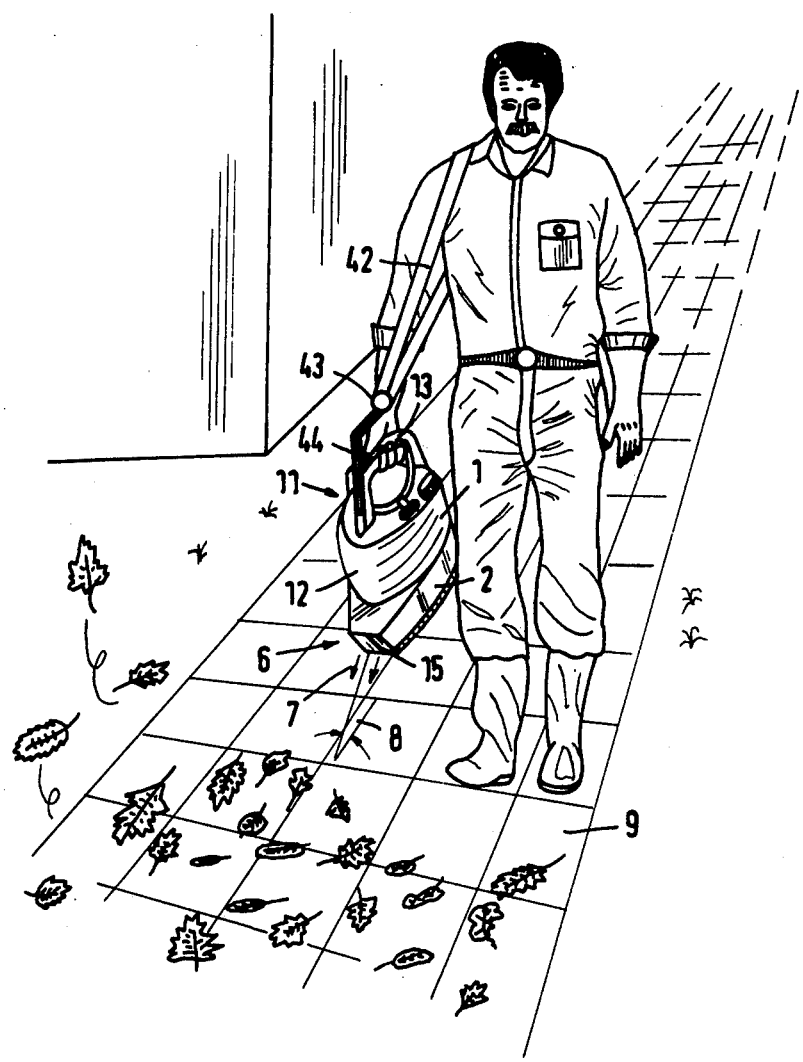
FIG. 1 schematically illustrates in a perspective view the operating position in which the illustrated embodiment of the inventive sweeping device is held by an operator.
Figure 2:
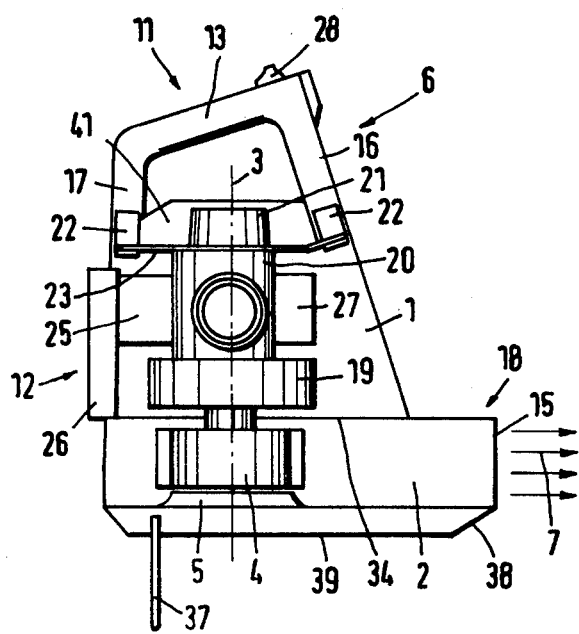
FIG. 2 is a partially-sectioned side view of the sweeping device of FIG. 1.

Referring now to the drawings in detail, the sweeping device 6 shown in FIG. 1 has a housing 12 with a handle 11 on which a shoulder strap 42 is fastened in such a manner that the device can be swung sideways by hand when grasping the handle 11. The air blast flow 7 discharges at an angle from the front side of the housing 12. The housing 12 of the sweeping device 6 comprises an upper housing part 1, and a lower housing part 2 (FIGS. 1 and 2). The housing 12 forms a cylindrical base body having a cross-sectional shape ranging from circular to oval. As shown in FIG. 2, an impeller or fanwheel blower 4, preferably a drum rotor, is arranged in the lower housing part 2 in such a way as to rotate about a vertical axis of rotation 3. The air blast flow 7 of the blower 4 is guided through an approximately horizontal air channel 18 formed or arranged on the housing part 2, and exits at an air discharge opening or outlet 15 which is at right angles with respect to the air channel 18.

Figure 3:
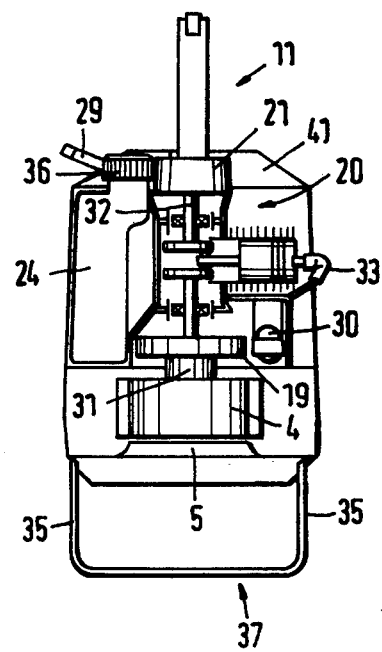
FIG. 3 is a partially-sectioned rear view of the sweeping device of FIG. 1.

The flywheel 19, an internal combustion engine 20, and a starter device 21 are arranged in the housing part 1, above the fanwheel blower or impeller 4, in alignment with the axis of rotation 3. The crankshaft 32 of the internal combustion engine 20, and the drive shaft 31 of the flywheel blower 4, are arranged coaxial relative to each other, as illustrated in FIG. 3.

Figure 4:
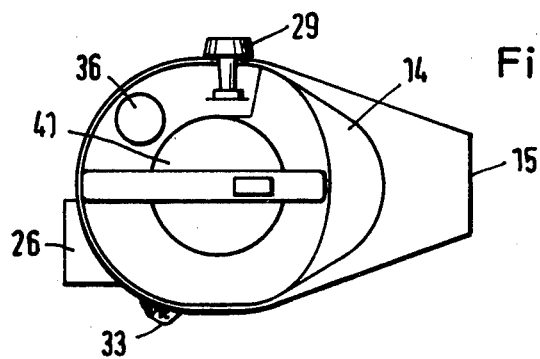
FIG. 4 is a plan view of the sweeping device of FIG. 1.

The internal combustion engine 20 is mounted on a support plate 23, to which the handle 11 is fastened. The handle 11 is arranged in the upper region of the housing part 1 behind the air discharge outlet 15 in the longitudinal direction of the air channel 18 (FIG. 4). A gas throttle control 28 is arranged in the front part of the handle 11 in a region thereof facing the air discharge outlet 15.

The handle 11 is approximately U-shaped, with the free leg ends preferably being connected with the support plate 23 via anti-vibration elements 22. The crosspiece between the legs 16 and 17 of the handle is constructed as the grip 13, which rises from the rear leg 17 in the direction toward the air discharge outlet 15, and forms an angle of preferably 110° to 130° with an imaginary extension of the axis of rotation 3. The front leg 16 forms a right angle with the grip 13, and consequently is aligned with respect to the end face of a curved-out portion 14 (FIG. 4), the extension of which continuously increases toward the front from the top to the bottom.

The upper housing part 1, with the handle 11, forms an attractive housing unit; the curved-out portion 14 is arranged above the air channel 18 and forms an optically smooth transition from the rear partially-cylindrical mantle surface of the housing part 1, to the housing part 2. The housing part 2 is adapted to the diameter of the lower end of the housing part 1, with the air channel 18 having an essentially rectangular cross section, and being formed by side walls tangentially connected to the rear partially-cylindrical wall. The starter device 21 of the engine 20 is arranged in the upper region of the housing part 1, preferably in the dome top of the upper housing part in the immediate vicinity of the handle 11. The starter device 21 is actuated with a pull handle 29, which is expediently located on that side facing the operator (FIG. 1). If the sweeping device 6 is started in this position, then, due to this arrangement of the starter device 21, only a small pivot moment is exerted on the sweeping device 6 itself as a consequence of the pull exerted upon the pull handle 29.

The necessary auxiliary devices for operating the internal combustion engine 20, including the muffler 27, carburetor 25, air filter 26, exhaust, and tank 24, are arranged around the internal combustion engine 20. The exhaust gases are advantageously drawn off on that side of the housing 12 which is remote from the operator (FIG. 1), so that the operator is not subjected to any annoyance.

The air filter 26 preferably opens on that side remote from the air discharge outlet 15 (FIG. 4), so that a drawing in of dirt that is whirled up or raised by the air flow 7 is extensively avoided.

The sweeping device 6 has a filler cap 36 for the fuel tank. This filler cap 36 is advantageously located on the top of the housing 12, so that an easy filling of the fuel tank is assured.

The spark plug 33 of the internal combustion engine 20 is connected with the ignition device 30 located in the housing part 2 (FIG. 3), and is expediently accessible from the outside, so that easy replacement of the spark plug is possible.

The two housing parts 1 and 2 are separated in an airtight manner from one another by a separating wall 34, whereby the air inlet opening 5 to the fanwheel blower or impeller 4 is arranged in the bottom 39 of the housing part 2. The air inlet opening 5 is located axially opposite the fanwheel blower 4; preferably, the cross-sectional surface thereof corresponds to that of the blower, so that a high rate of air flow can be achieved.

A stand or support 37 fastened in the housing 12 is provided to prevent a closing of the air inlet opening 5 when the sweeping device 6 is placed on the bottom surface 39. The stand or support 37 comprises a U-shaped bracket located transverse to the handle 11, and the free, outer legs 35 of the bracket are anchored in the housing 12. The support 37 is arranged opposite the air discharge outlet 15 at the rear end of the sweeping device 6; the bottom surface 39 of the front end of the air channel 18 is inclined toward the air flow 7, so that a secure support of the sweeping device 6 is assured by this incline 38 and the stand or support 37, without closing off the air inlet opening 5.

The rest position determined by the incline 38 and the support 37 is advantageously such that the bottom surface 39 is inclined to the horizontal at an angle of approximately 18° to 25°.

The recoil or kickback forces of the air flow 7 increase this angle to 20° through 40° when the sweeping device 6 is lifted into the operating position shown in FIG. 1, so that the air flow 7 strikes the ground, floor, path, walkway, sidewalk, roadway, etc. 9 at a corresponding angle. In this operating position, the grip 13 of the handle 11, because of the construction, is now horizontal, so that the supporting or carrying hand of the operator need not be at an angle, which would strain the wrist. Since with the sweeping device 6 shut down or placed on the ground the grip 13 is already nearly horizontal, such angle relative to the horizontal amounting to only 2° to 15°, an easy transition of the sweeping device 6 into the operating position of FIG. 1 is assured when the sweeping device 6 is picked up. In addition, a favorable center of gravity location is attained by arranging the internal combustion engine 20, and the auxiliary devices, above the fanwheel blower or impeller 4, so that gravitational forces are also effective for assuming the operating position when the sweeping device 6 is picked up.

Due to the recoil or kickback forces of the air flow 7, the sweeping device 6, during operation (FIG. 1), is slightly inclined relative to the vertical, so that the air flow 7 strikes the ground, path, walkway, sidewalk, or other surface which is to be cleaned at an angle 8 of 20° to 40°. Practically no gyroscopic or centrifugal forces arise due to the vertical axis of rotation 3 of the fanwheel blower or impeller 4; such forces would otherwise have to be absorbed by the arm of the operator during guidance of the air flow 7. By positioning the fanwheel blower or impeller 4 in the lower housing part 2, it is possible to arrange the air discharge outlet 15 directly in the vicinity of the bottom without having to employ complicated direction-changing devices which can also be disadvantageous for the flow.

The favorable center of gravity attained by the arrangement of the internal combustion engine 20, and the auxiliary devices thereof, above the fanwheel blower or impeller 4, additionally makes possible a good handling and carrying of the sweeping device 6.

A simple handling of the sweeping device 6 is possible by the thumb of the carrying hand due to the positioning of the gas throttle control 28 in the front region of the handle 11.

An advantageous further embodiment according to the present invention is illustrated in FIGS. 5 and 6, in which connection the same reference numerals are used for identical elements. The air inlet opening 5' is arranged in the separating wall 34 between the housing part 1 and the housing part 2, with air inlet openings 40 being provided in the upper region of the housing 1, preferably in the region of the domed top 41 of the housing. The air entering or flowing in through the housing part 1 at the same time cools the internal combustion engine 20, so that an additional cooling fan can be eliminated. Additionally, the air flow 7 is warmed up in this manner, which can be advantageous in many applications. Furthermore, no special stand or support has to be provided with this sweeping device 6'. The sweeping device 6' can be placed directly on the bottom surface 39.

In an advantageous further embodiment, the exhaust gases of the internal combustion engine 20 can be introduced into the upper housing part 1 in a closed manner, and can thereby be supplied to the blower air flow 7 on the intake side of the fanwheel blower or impeller 4, so that the temperature of the blower air flow 7 is further increased.

Furthermore, spray medium in pulverized or liquid form can be added to the air flow 7, for which purpose suitable tanks can be arranged on or in the housing 12 of the sweeping device 6. The medium can be fed directly into the air channel 18 of the lower housing part 2, or can be fed ahead of the air inlet opening 5' to the fan wheel blower or impeller 4.

In an advantageous further embodiment of the invention, especially with engines having greater power, a shoulder strap 42 is provided which is hooked by means of a suspension hook or ring 43 in a rigid bracket 44 which can be mounted to the handle 11 in the axis of gravity thereof, and can be locked with the handle 11 (FIG. 7). The weight of the sweeping device 6 is carried on the shoulder of the operator in such a way that the hand can carry out control of the air flow 7 merely by changing the operating position. The bracket 44 can be inserted in guide rails 45 at the front part of the handle, where it can be fastened by means of a clamping piece 46 and an adjustment or set screw 47.

The present invention is, of course, in no way restricted to the specific disclosure of the specification and drawings, but also encompasses any modifications within the scope of the appended claims.

What we claim is:

1. A portable sweeping device which removes debris with an air-blast flow, said device comprising:
   a housing having an upper end, an air inlet, and an air discharge outlet;
   a handle arranged at said upper end of said housing and said device being intended to be held by the operator in one hand;
   a fanwheel blower arranged in said housing and having an axis of rotation which is at least substantially vertical in the operating position of said sweeping device; and
   an internal combustion engine having an air intake and being arranged in said housing in the direction of said axis of rotation of said fanwheel blower for driving the latter to generate an air flow which exits said housing through said air discharge outlet thereof; and,
   said housing including:
   an upper housing part to which said handle is attached and which accommodates said internal combustion engine and its auxiliary devices, said upper housing part including a cylinder-like base body having a cross section which is circular to oval in shape; and, a lower housing part which is arranged axially below said upper housing part remote from said handle, and accommodates said fanwheel blower, with an air channel which terminates in said air discharge outlet being formed by said lower housing part, said air channel communicating with said air flow generated by said fanwheel blower; and, said upper housing part including a domed top for accommodating a starter device arranged in the region of said domed top in the immediate vicinity of said handle and wherein exhaust gases from said internal combustion engine are discharged on the side of said device away from the side of the operator's body corresponding to the one hand in which the device is held; and, said domed top further accommodating, as one of said auxiliary devices of said internal combustion engine, an air intake filter which is mounted on said air intake and which is open to the atmosphere on that side of said device remote from said air discharge outlet.

2. A sweeping device according to claim 1, in which said bottom surface of said lower housing part is inclined toward said air discharge outlet in that region of said air channel which is adjacent to said air discharge outlet; and which includes a stand which comprises a U-shaped bracket arranged transverse to said handle and having two legs which are fastened to that end of said lower housing part remote from said air discharge outlet; with said stand being dimensioned in such a way that the rest position of said device determined thereby corresponds approximately to the operating position thereof.

3. A sweeping device according to claim 1, in which said upper housing part is provided with a support plate for supporting said internal combustion engine, and in which said handle is fastened to said support plate via anti-vibration elements.

4. A portable sweeping device which removes debris with an air-blast flow, said device comprising:

a housing having an upper end, an air inlet, and an air discharge outlet;

a handle arranged at said upper end of said housing;

a fanwheel blower arranged in said housing and having an axis of rotation which is at least substantially vertical in the operating position of said sweeping device; and, an internal combustion engine arranged in said housing in the direction of said axis of rotation of said fanwheel blower for driving the latter to generate an air flow which exits said housing through said air discharge outlet thereof;

said handle being provided with a mounting support for mounting a shoulder strap thereto, said mounting support comprising a rigid bracket having a first and second end, and being attached to said handle in the axis of gravity thereof, said first bracket end being adapted to be secured to said handle, and said second bracket end being provided with a freely rotatable suspension mechanism to effect mounting of said shoulder strap.

5. A sweeping device according to claim 1, in which said fanwheel blower is a drum rotor.

6. A portable sweeping device for blowing twigs, leaves and other debris with an airstream comprising:

a housing having upper and lower regions;

air discharge means formed in one of said regions of said housing for defining and directing the airstream away therefrom;

said air discharge means being disposed in said housing so as to cause said airstream to flow substantially along a plane partitioning said housing into righthand and lefthand sections;

impeller means arranged in said one region for moving the air of the airstream along said discharge means and defining an axis of rotation extending into the other one of said regions of the housing, said axis lying substantially in said plane;

an internal combustion engine arranged in the other one of said regions and having a crankshaft extending along said axis for driving said impeller means; said internal combustion engine including: a cylinder and piston assembly arranged in one of said sections and a fuel tank arranged in the other one of said sections; and, a handle arranged at the upper region of said housing so as to be intersected by said plane whereby the operator grasping said handle can easily maneuver the device unimpaired by forces about said axis because of the balanced disposition of said tank, assembly and impeller means with respect to said plane.

7. The device according to claim 6, said handle being the only handle on said housing whereby said device is maneuvered by the operator with only one hand.

8. The device according to claim 7, said handle being disposed in said plane and said device being intended to be held by the operator in the right hand, said cylinder and piston assembly being disposed in said righthand section and said fuel tank being disposed in said lefthand section whereby said assembly is disposed on a side of said device away from the operator and said fuel tank is disposed on the other side of said device to shield the operator from the heat generated by said assembly.

9. The device according to claim 6, said internal combustion engine further including an air filter, a carburetor, and a muffler; said upper region of said housing defining a hollow space forward of said crankshaft in the vicinity of said plane for accommodating said muffler in spaced relationship to the outer wall of said housing enclosing and defining said upper region whereby space for adequate cooling air for cooling said muffler is provided to prevent said wall from becoming excessively heated during operation of the device thereby preventing the operator from receiving a burn injury when inadvertantly contacting said wall.

10. The device according to claim 9, said upper region also defining a hollow space rearward of said crankshaft for accommodating said filter and said carburetor, the wall of said upper region being configured so that the inner width dimension of said upper region becomes greater in the direction of said plane from the top of said upper region to the bottom of said upper region adjacent said lower region.

11. A portable sweeping device for blowing twigs, leaves and other debris with an airstream comprising:

a housing having upper and lower parts;

air discharge means formed in said lower part of said housing for defining and directing the airstream away therefrom;

said air discharge means being of rectangular section and being defined by said lower part so as to cause said airstream to flow substantially along a plane partitioning said housing into righthand and lefthand sections;

impeller means arranged in said lower part for moving the air of the airstream along said discharge means and defining an axis of rotation extending into said upper part of the housing, said axis lying substantially in said plane;

an internal combustion engine arranged in said upper part and having a crankshaft extending along said axis for driving said impeller means; said internal combustion engine including: a cylinder and piston assembly arranged in one of said sections and a fuel tank arranged in the other one of said sections;

the rearward portion of said upper part being substantially cylindrical and defining a smooth continuous surface transition to said lower part; whereas, the forward portion of said upper part being configured so that the inner width dimension in the direction of said plane becomes greater from the top of said upper part to the bottom of said upper part whereat the forward wall of said upper part terminates on the top surface of said lower part; and, a handle formed as a unit with said upper part and disposed in said plane, said handle having a forward segment in alignment with the forward portion of said upper part.

12. A portable sweeping device for blowing twigs, leaves and other debris with an airstream comprising:

a housing having upper and lower parts;

air discharge means formed in said lower part of said housing for defining and directing the airstream away therefrom;

said air discharge means being defined by said lower part so as to cause said airstream to flow substantially along a plane partitioning said housing into righthand and lefthand sections;

impeller means arranged in said lower part for moving the air of the airstream along said discharge means and defining an axis of rotation extending into said upper part of the housing, said axis lying substantially in said plane;

an internal combustion engine arranged in said upper part and having a crankshaft extending along said axis for driving said impeller means; said internal combustion engine including: a cylinder and piston assembly arranged in one of said sections and a fuel tank arranged in the other one of said sections;

air passage means communicating with said air discharge means for conducting air from the top of said upper part and over and past said engine to said air discharge means whereby said engine is cooled and the air passing through said impeller means and discharging from said device is warmed by said engine; and, a handle arranged at the upper region of said housing so as to be intersected by said plane whereby the operator grasping said handle can easily maneuver the device unimpaired by forces about said axis because of the balanced disposition of said tank, said assembly and said impeller means with respect to said plane.

* * * * *